United States Patent
Beckman et al.

(10) Patent No.: US 9,643,718 B1
(45) Date of Patent: May 9, 2017

(54) SIMULATED GROUND EFFECT FOR AERIAL VEHICLES

(71) Applicant: Amazon Technologies, Inc., Seattle, WA (US)

(72) Inventors: Brian C. Beckman, Newcastle, WA (US); Allan Ko, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/975,491

(22) Filed: Dec. 18, 2015

(51) Int. Cl.
| | |
|---|---|
| B64C 27/46 | (2006.01) |
| B64C 1/06 | (2006.01) |
| B64C 27/14 | (2006.01) |
| B64C 39/02 | (2006.01) |

(52) U.S. Cl.
CPC ............ B64C 27/463 (2013.01); B64C 1/061 (2013.01); B64C 27/14 (2013.01); B64C 39/024 (2013.01); *B64C 2201/128* (2013.01); *B64C 2220/00* (2013.01)

(58) Field of Classification Search
CPC ....... B64C 27/463; B64C 1/061; B64C 27/14; B64C 39/024; B64C 2201/128; B64C 2220/00
See application file for complete search history.

(56) References Cited

U.S. PATENT DOCUMENTS

| | | | | | |
|---|---|---|---|---|---|
| 2,209,301 | A | * | 7/1940 | Johnson | B63H 20/106 123/193.1 |
| 2,357,942 | A | * | 9/1944 | Gray | F02B 61/045 123/195 P |
| 2,507,034 | A | * | 5/1950 | Martin | F01P 3/202 123/41.72 |
| 2,609,782 | A | * | 9/1952 | Kiekhaefer | B63H 20/10 440/78 |
| 2,644,434 | A | * | 7/1953 | Watkins | F01P 3/202 123/41.47 |
| 2,718,792 | A | * | 9/1955 | Kiekhaefer | B63H 21/265 192/93 R |
| 3,195,521 | A | * | 7/1965 | Larsen | F01P 3/202 123/195 P |
| 3,431,882 | A | * | 3/1969 | Irgens | F01P 3/202 123/195 P |
| 3,520,270 | A | * | 7/1970 | Miller | F01N 13/12 123/65 E |
| 4,033,282 | A | * | 7/1977 | Pichl | B63H 21/26 123/195 P |
| 4,240,990 | A | * | 12/1980 | Inhofer | B01F 3/04539 210/219 |
| 4,308,221 | A | * | 12/1981 | Durda | A01K 63/042 209/169 |
| 4,726,795 | A | * | 2/1988 | Uehara | F02B 61/045 440/52 |

(Continued)

*Primary Examiner* — Rodney Butler
*Assistant Examiner* — Frederick Brushaber
(74) *Attorney, Agent, or Firm* — Athorus, PLLC

(57) ABSTRACT

Ground effect acting on an aerial vehicle, such as an unmanned aerial vehicle, may be simulated by discharging a gas around propeller blades of the aerial vehicle while the propeller blades are rotating. For example, a gas, such as air, may be discharged at or near the tip of the propeller blades with enough velocity to disrupt the airflow around the blade tips, thereby altering the sound generated by rotation of the propeller blade.

17 Claims, 8 Drawing Sheets

(56) References Cited

U.S. PATENT DOCUMENTS

| | | | | |
|---|---|---|---|---|
| 4,769,077 A | * | 9/1988 | Crocker | C04B 28/065 |
| | | | | 106/695 |
| 4,861,293 A | * | 8/1989 | McGowan | F01P 3/202 |
| | | | | 440/76 |
| 5,171,177 A | * | 12/1992 | Hubbell | B63H 20/245 |
| | | | | 440/76 |
| 6,119,638 A | * | 9/2000 | Kennedy | F01P 5/10 |
| | | | | 123/185.12 |
| 6,196,887 B1 | * | 3/2001 | Ogasawara | B63H 20/32 |
| | | | | 440/75 |
| 7,997,264 B2 | * | 8/2011 | Sankrithi | F24J 2/1052 |
| | | | | 126/571 |
| 8,661,777 B2 | * | 3/2014 | Zohar | F03G 6/067 |
| | | | | 60/39.182 |
| 9,080,450 B2 | * | 7/2015 | Seifert | B64C 39/005 |
| 9,206,710 B2 | * | 12/2015 | Gurin | F01K 23/10 |
| 9,272,783 B2 | * | 3/2016 | Pearson | B64C 39/024 |
| 2003/0140614 A1 | * | 7/2003 | Nearhoof, Sr. | F02C 9/28 |
| | | | | 60/39.281 |
| 2003/0230671 A1 | * | 12/2003 | Dunn | B64D 27/24 |
| | | | | 244/53 R |
| 2008/0121755 A1 | * | 5/2008 | Bennett | B64C 39/024 |
| | | | | 244/59 |
| 2009/0032638 A1 | * | 2/2009 | Zhao | B64C 27/16 |
| | | | | 244/6 |
| 2010/0293920 A1 | * | 11/2010 | Mackie | F02C 6/206 |
| | | | | 60/226.1 |

* cited by examiner

SIMULATED GROUND EFFECT FOR AERIAL VEHICLES

BACKGROUND

Vehicle traffic around residential areas continues to increase. Historically, vehicle traffic around homes and neighborhoods was primarily limited to automobile traffic. However, the recent development of aerial vehicles, such as unmanned aerial vehicles, has resulted in a rise of other forms of vehicle traffic. For example, hobbyists may fly unmanned aerial vehicles in and around neighborhoods, often within a few feet of a home. Likewise, there is discussion of electronic-commerce retailers, and other entities, delivering items directly to a user's home using unmanned aerial vehicles. As a result, such vehicles may be invited to navigate into a backyard, near a front porch, balcony, patio, and/or other locations around the residence to complete delivery of packages.

BRIEF DESCRIPTION OF THE DRAWINGS

The detailed description is described with reference to the accompanying figures. In the figures, the left-most digit(s) of a reference number identifies the figure in which the reference number appears.

DETAILED DESCRIPTION

Figure 1:
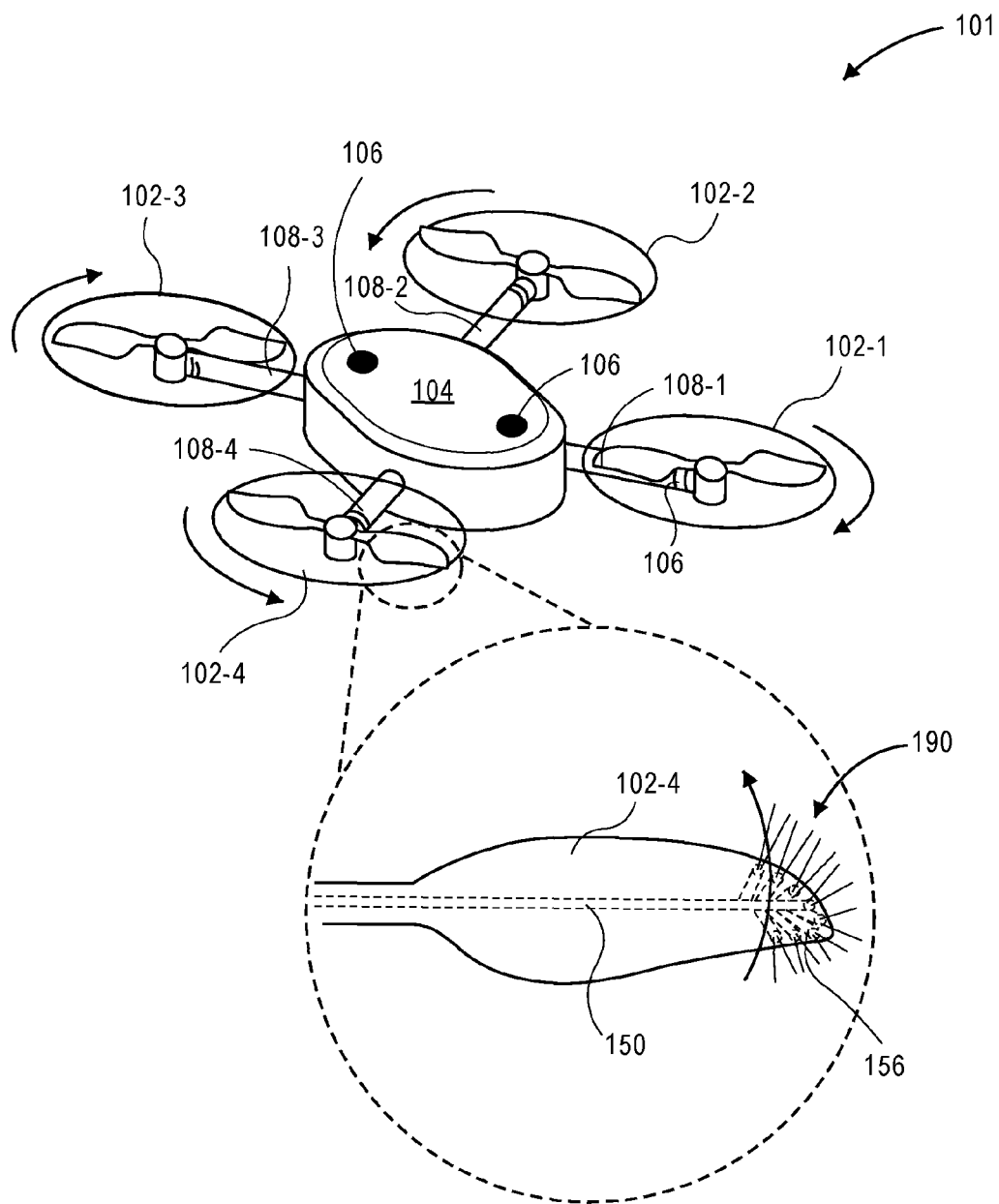
FIG. 1 depicts a view of an aerial vehicle, according to an implementation.

This disclosure describes methods and apparatus for simulating ground effects for propellers of aerial vehicles to reduce the sound generated by those propellers during operation. Ground effect is a well-known phenomenon that occurs when an aerial vehicle flies at a level that is approximately at or below the length of the aerial vehicles wingspan or propeller diameter. When flying at those low levels, the ground disrupts the airflow around the propellers or wings. This alteration results in lower induced drag, which increases the speed and lift of the aerial vehicle, and/or lift generated by the rotation of propellers. The increased lift from the rotating propellers results in the aerial vehicle being able to maintain the low altitude while rotating the propellers at a slower speed. In addition, the disruption of airflow caused by ground effect may also influence the formation of vortices. The slower rotation of the propellers and/or the disrupted formation of the vortices reduces the sound generated by the aerial vehicle when the aerial vehicle is close enough to the ground to experience ground effect.

The implementations described herein simulate ground effect on propellers of an aerial vehicle when the aerial vehicle is at altitudes above those that are typical for ground effect so that sound generated by the aerial vehicle can be reduced or otherwise altered. For example, a gas, such as air, may be discharged at or near the tip of the propeller blades with enough velocity to disrupt the airflow around the blade tips. The disrupted airflow may impact the lift generated by the rotation of the propeller, disrupt formation of vortices at the blade tip, and/or to cause formed vortices to be displaced an amount sufficient to reduce blade vortex interaction ("BVI"). BVI occurs when a following propeller blade passes through or interacts with vortices formed by a leading propeller blade. When a following propeller blade passes through formed vortices, the propeller blade disrupts the vortices and the disruption generates sound.

By disrupting the airflow around the tip of the propeller blade, the sound generated from the rotation of the propeller blade is reduced. For example, in the instance of increased lift, the rotational speed of the propeller blade may be reduced, thereby reducing sound generated by the rotation of the propeller blade. In other examples, the disrupted formation of vortices and/or the displacement of formed vortices may reduce BVI sounds.

In some implementations, the gas is discharged when the aerial vehicle is at low altitudes (but higher than altitudes in which actual ground effect occurs), such as during item delivery, to reduce the sounds generated by the aerial vehicle. For example, when the aerial vehicle is between approximately twenty-five feet and approximately six feet, gas may be discharged at or near the tip of the propeller blades to simulate ground effect and reduce the sound generated by the aerial vehicle during item delivery.

FIG. 1 is a view of an aerial vehicle 101 configured for sound control by simulating ground effects while the aerial vehicle is operating. The propellers 102-1, 102-2, 102-3, and 102-4 are powered by motors and spaced about a body 104 of the aerial vehicle 101 as part of a propulsion system. A control system (not shown), which may be positioned within the body 104, is utilized for controlling the motors for flying the aerial vehicle 101, as well as controlling other operations of the aerial vehicle 101. Each of the motors may be rotated at different speeds, thereby generating different lifting forces by the different propellers 102.

The motors may be of any type and of a size sufficient to rotate the propellers 102 at speeds sufficient to generate enough lift to aerially propel the aerial vehicle 101 and any items engaged by the aerial vehicle 101 so that the aerial vehicle 101 can navigate through the air, for example, to deliver an item to a location. While the example of FIG. 1 includes four motors and propellers, in other implementations, more or fewer motors and/or propellers may be utilized for the propulsion system of the aerial vehicle 101. Likewise, in some implementations, the motors and/or propellers may be positioned at different locations and/or orientations on the aerial vehicle 101. Alternative methods of propulsion may also be utilized in addition to the propellers and propeller motors. For example, engines, fans, jets, turbojets, turbo fans, jet engines, and the like may be used in combination with the propellers and propeller motors to propel the aerial vehicle.

The body 104 or frame of the aerial vehicle 101 may be of any suitable material, such as graphite, carbon fiber, and/or aluminum. In this example, the body 104 of the aerial vehicle 101 includes four motor arms 108-1, 108-2, 108-3, and 108-4 that are coupled to and extend from the body 104 of the aerial vehicle 101. The propellers 102 and corresponding propeller motors are positioned at the ends of each motor arm 108. In some implementations, all of the motor arms 108 may be of approximately the same length while, in other implementations, some or all of the motor arms may be of different lengths. Likewise, the spacing between the two sets of motor arms may be approximately the same or different.

In some implementations, one or more sensors 106 configured to measure sound at the aerial vehicle is included on the aerial vehicle 101. The sensors 106 may be at any location on the aerial vehicle 101. For example, a sensor 106 may be positioned on each motor arm 108 and adjacent to the propeller 102 and/or propeller motor so that different sensors can measure different sounds generated at or near the different propellers 102. In another example, one or more sensors may be positioned on the body 104 of the aerial vehicle 101. The sensors 106 may be any type of sensors capable of measuring sound and/or sound waves. For example, the sensor may be a microphone, transducer, piezoelectric sensor, an electromagnetic pickup, an accelerometer, an electro-optical sensor, an inertial sensor, etc.

As discussed in further detail below, one or more of the propellers 102 may include a gas discharge cavity 150. The cavity 150 may extend the length of the propeller 102 and be configured to allow a gas to pass through the cavity and exit one or more openings at the end of the cavity near a tip of the propeller 102. For example, the propeller 102-4 includes a gas discharge cavity 150 that extends down the middle of the surface area of the propeller 102-4 and includes a plurality of openings 156 at the end of the cavity. In other implementations, there may be a single opening at the end of cavity 150. The opening of the cavity is aligned so that the discharged gas is blown outward from the tip of the propeller, as illustrated in the expanded view.

The cavity 150 and openings 156 may be formed on the interior of the propellers 102, on an upper surface area of the propellers, on a lower surface area of the propellers, along the leading edge of the propellers, along the trailing edge of the propellers, and/or at any other location along the propellers.

A gas, such as air, hydrogen, helium, nitrogen, oxygen, argon, krypton, xenon, sulfur hexafluoride, etc. may be discharged so that is exits the openings 156 at the end of the propeller. The gas is discharged with enough velocity to disrupt the airflow around the propeller blade, thereby reducing the sound generated by rotation of the propeller blade. For example, if the area of the circle in which the propeller 102 rotates is 1 meter squared ("m$^2$") and the lifting force to be generated by rotation of the propellers is approximately 50 Newton ("N"), or 50 kilogram meters per second squared ("kg*m/sec$^2$"), the flow velocity of the discharged gas to simulate a ground effect, can be roughly estimated from an equal amount of pressure, or 50 Pascal (Pa). So:

$$\frac{1}{2}\rho * v^2 = 50 \text{ Pa} = 50\frac{kg}{m*\sec^2}$$

$$\rho * v^2 = 100 \text{ Pa} = 100\frac{kg}{m*\sec^2}$$

$$v = \rho * \sqrt{100 \text{ Pa}} = \rho * \sqrt{100\frac{kg}{m*\sec^2}}$$

Where $\rho=1.25$ kg/m$^3$, the density of air, v is computed as 12.5 m/s, where v is the flow velocity of the gas exiting the openings of the cavity.

While a flow velocity of gas 190 out of the openings 156 of 12.5 m/s will simulate ground effect, in some implementations, the flow velocity of the gas may be less and still alter the sound generated by rotation of the propeller. Likewise, in some implementations, using gasses of different densities may, in addition to simulating ground effect, alter the generated sound as a result of varying densities of the gasses.

In some implementations, the aerial vehicle 101 may begin discharging gas at a first velocity (e.g., 50% of the velocity needed to fully simulate ground effect) and utilize the sensors to measure the sound around the aerial vehicle 101, and/or a reduction in generated sound by comparing a sound measured by the sensors 106 prior to discharge of the gas and sound measured during discharge of the gas 190. If the sound is below a defined threshold (allowable sound level), the velocity at which the gas is being discharged may be maintained or reduced. However, if the measured sound is not below the allowable sound level, the velocity of the discharged gas may be increased to further reduce the sound generated by the rotation of the propellers. In some implementations, the sensors 106 positioned at or near each propeller may independently measure sound and the velocity of the gas being discharged from that propeller may be adjusted based on the measured sound at the propeller. As such, the gas discharge and sound alteration may be independently controlled at each propeller of an aerial vehicle.

As noted above, when a propeller rotates, vortices are generated at the tip of the propeller blade and those vortices generate sound, especially when a following blade passes through the formed vortices (i.e., BVI). By discharging a gas at the tip of the propeller blade, thereby disrupting the airflow around the propeller blade, the formation of the tip vortices may be disrupted (e.g., the formed vortices may be smaller and/or less in number), such that the resulting sound is reduced. Likewise, the velocity of the discharged gas may push the formed vortices away from the path of the propeller blades so that a following propeller blade does not pass through the formed vortices. The displacement of formed vortices reduces BVI, thereby further reducing the sound generated by the rotation of the propeller.

While the implementations of the aerial vehicle discussed herein utilize propellers to achieve and maintain flight, in other implementations, the aerial vehicle may be configured in other manners. For example, the aerial vehicle may be a combination of both propellers and fixed wings. In such configurations, the aerial vehicle may utilize one or more propellers to enable takeoff, and/or landing, and a fixed wing configuration or a combination wing and propeller configuration to sustain flight while the aerial vehicle is airborne. In some implementations, one or more of the propulsion mechanisms (e.g., propellers and motors) may have a variable axes such that it can rotate between vertical and horizontal orientations.

Figure 2:
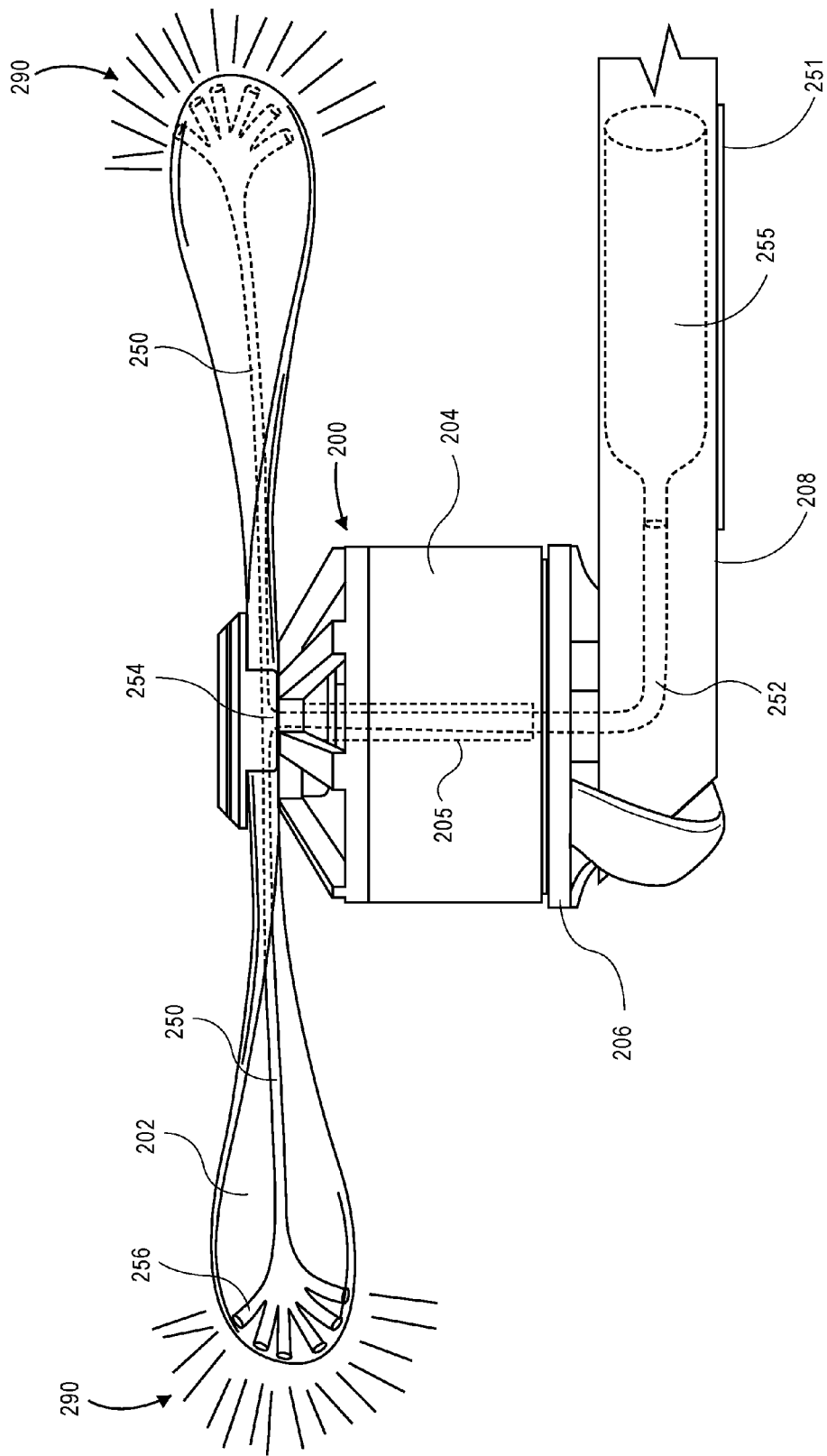
FIG. 2 depicts a motor mounted to a motor arm, according to an implementation.

FIG. 2 depicts a diagram of a motor 200 coupled to a motor arm 208, according to an implementation. In this example, the motor may be any type of motor 200, such as a brushless DC motor, in which a rotor 204 rotates about a stator (not shown in FIG. 2) to drive rotation of a propeller 202. The motor 200 includes a base 206 that is affixed to a motor arm 208 that secures the motor 200 to the motor arm 208 of the aerial vehicle. The base 206 of the motor 200 may be affixed to the motor arm 208 by a series or type of screws, clamps, mounts, fasteners, etc.

The propeller 202 is affixed to the rotor 204 of the motor 200 such that the propeller 202 rotates with a rotation of the rotor 204. For example, in some configurations, a propeller shaft 205 may extend from the top of the rotor down the center of the stator and the rotor 204 and the propeller 202 may be affixed to the shaft. In other configurations, the propeller 202 may be directly coupled or clamped to the rotor 204.

Positioned within the motor arm 208 is one or more gas canisters 255 that contain gas that may be discharged. The gas canister 255 is affixed to a cavity 252 (e.g., a tube) that extends from the gas canister 255 up the shaft 205 and couples at a joint 254 to the cavity 250 formed in or coupled to the propeller 202. The joint 254 may be any type of connection that enables rotation of the propeller 202 and allows gas discharged from the gas canister 255 to pass through the cavity 252 and through the cavity 250 so that the gas 290 exits the openings 256 at the end of the cavity 250.

The discharge of gas 290 from the gas canister 255 may be controlled by a gas discharge controller, discussed below. The gas discharge controller may, for example, determine if one or more operating conditions satisfy a criterion and open or close the gas canister 255 and/or the openings 256 to enable or disable the discharge of gas 290 from the gas canister 255 and out the openings 256 that are positioned proximate the tip of the propeller blades of the propeller 202.

Operating conditions that may be monitored by the gas discharge controller include, but are not limited to, an altitude of the aerial vehicle, a sound level around the aerial vehicle, a frequency spectrum of the sound around the aerial vehicle, a position of the aerial vehicle, or a distance between the aerial vehicle and an object (e.g., human, building, automobile, etc.). Similarly, the criterion are related to the monitored operating conditions. For example, one criterion may be an altitude of the aerial vehicle, such that if the aerial vehicle is below a defined altitude (e.g., twenty-five feet) the criterion is satisfied and gas may be discharged to reduce a sound generated by the aerial vehicle.

In another example, an allowable sound level and/or frequency spectrum may be defined and if the sound measured around the aerial vehicle exceeds either the sound level and/or the frequency spectrum, the criterion may be satisfied and the gas discharged. In still another example, the position of the aerial vehicle may be monitored and if the aerial vehicle is positioned in an area populated by humans, it may be determined that the criterion is satisfied and the gas discharged. In a similar manner, if the aerial vehicle is within a defined distance of an object (e.g., human, building, automobile, etc.) it may be determined that the criterion is satisfied and the gas discharged to reduce the sound generated by the aerial vehicle.

As will be appreciated any one or more conditions may be satisfied and any number of criteria may be considered in determining whether to discharge gas to reduce the sound of the aerial vehicle. Likewise, in some implementations, multiple criteria may be specified for one or more conditions and as those criteria are satisfied, a velocity of the discharged gas may be adjusted. For example, a first criterion may be satisfied when the condition of altitude of the aerial vehicle passes below fifty feet such that gas is discharged at a first velocity. When the altitude of the aerial vehicle falls below twenty-five feet a second criterion may be satisfied and the gas discharged at a second, higher velocity.

In some implementations, the gas canister may be replaceable. For example, an access point 251 may be incorporated into the motor arm 208 that enables access and replacement of the gas canister. In some implementations, the replacement of the gas canister may be performed using automation, such as a robotic unit configured to remove a used gas canister and insert a filled gas canister while the aerial vehicle is not airborne (e.g., being loaded with a payload and/or while charging), or during operation of the aerial vehicle.

In some implementations, the gas canister may be a single use gas canister in which the gas is discharged when it is determined that the aerial vehicle has dropped below a defined altitude and is delivering a payload into an area that is populated by humans. In such an implementation, the gas may be stored in the gas canister under pressure that will result in the gas being discharged at a velocity that will, at least partially, simulate ground effect and alter the sound generated by the propellers of the aerial vehicle. Likewise, because it may only be beneficial to alter the sound generated by the aerial vehicle when the aerial vehicle is below a defined altitude, and a time required to deliver a payload and ascend above the defined altitude can be estimated, the pressure and the amount of gas to be contained in the canister can be pre-determined. Specifically, it can be determined how much gas at a particular pressure is needed so that gas can be discharged out of the openings 256 of the cavity at a specified velocity during the time that the aerial vehicle is below the defined altitude.

In other implementations, rather than, or in addition to a gas canister, the aerial vehicle may include one or more scoops that allow air to flow into the scoops as the aerial vehicle is aerially navigating. The collected air may then be stored in canisters on the aerial vehicle or allowed to pass through the cavity and discharged out the openings. In such implementations, a pump may be utilized to control the flow or velocity of the air that is discharged through the openings of the cavity.

Figure 3:
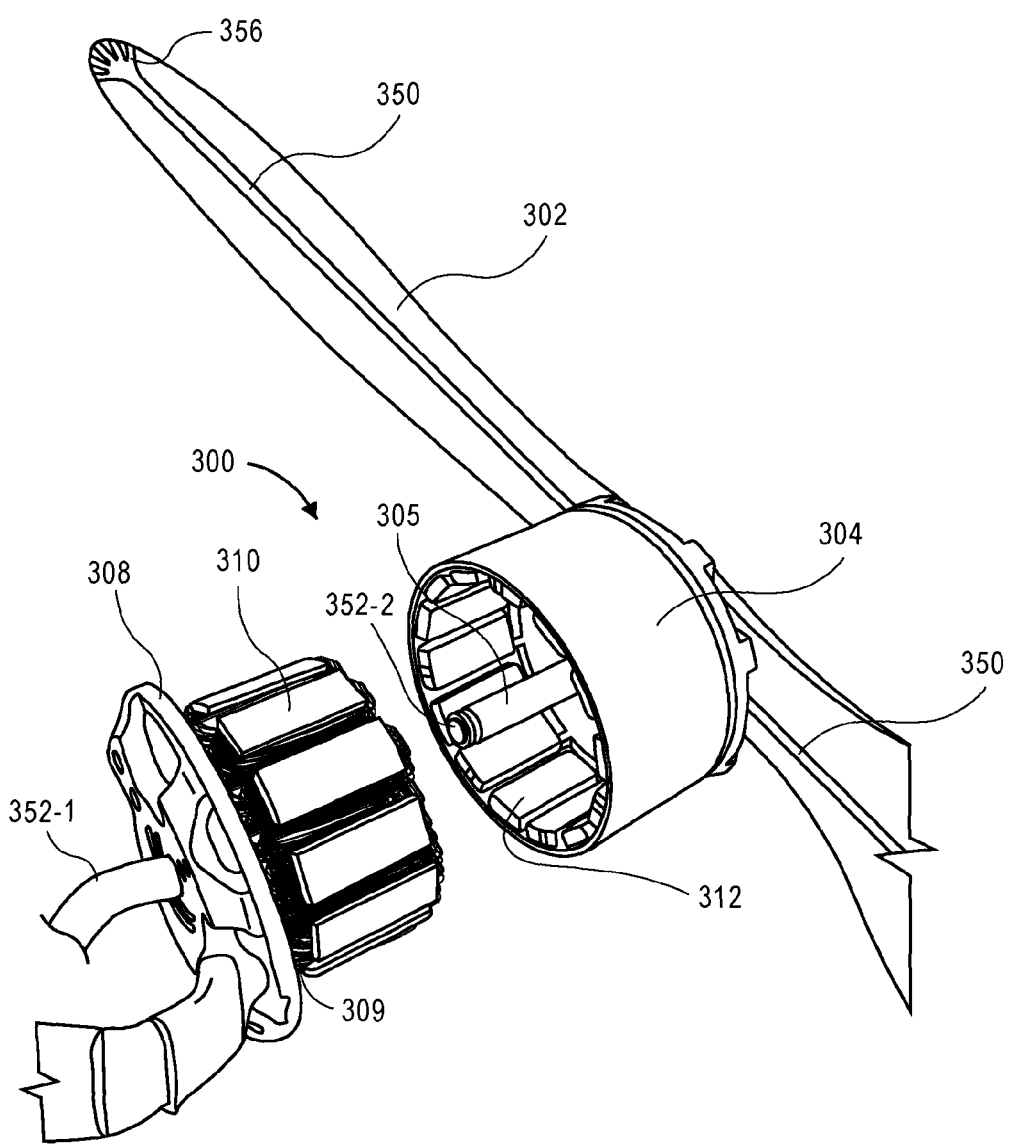
FIG. 3 depicts a detailed view of a motor and the magnets of the rotor of the motor, according to an implementation.

FIG. 3 depicts a detailed view of a motor 300 and the magnets 312 of the rotor 304 of the motor, according to an implementation. A brushless DC motor typically includes a base 308, a stator 309, and a rotor 304. The base 308 is generally used to affix the motor 300 to an aerial vehicle, such as a UAV. Likewise, the stator 309 is coupled to the base. The stator 309, also known as an armature, includes an electromagnetic assembly 310, and is typically configured in a cylindrical manner, as shown in FIG. 3, and remains stationary on the base.

The rotor 304 is also configured in a cylindrical manner such that it extends above the base 308 and substantially encompasses and rotates around the stator 309. On an interior surface of the rotor are a series of magnets 312 that are used to drive rotation of the rotor. Specifically, as is known in the art, when a current is applied to the electromagnets 310, it causes alternating polarities of the electromagnets which attract or repel the magnets 312 affixed to the interior surface of the rotor 304. The attraction/repulsion of the magnets 312 by the electromagnets 310 of the stator 309 cause the rotor 304 to rotate. A propeller 302 is also affixed to the rotor 304 and rotates with the rotor 304.

As illustrated, the cavity 352-1 may, in one implementation, extend up through the base 308 of the motor 300 and through a central portion of the stator 309. Likewise, a shaft 305 that is coupled to and extends down from the top of the rotor 304 and toward the base may include a cavity 352-2 that couples with the cavity 352-1 so that gas can pass through the base 308, the stator 309 and the rotor 304 up to the propeller 302. The propeller 302 includes a cavity 350 that is formed in and/or coupled to the propeller 302 that is configured to receive gas from the cavity 352 and allow the gas to pass toward an end of the propeller 302 and exit the openings 356 at the tip of the propeller blades of the propeller 302.

While the example illustrated in FIG. 3 shows the cavity passing through the center of the motor 300, in other implementations the cavity may not pass through the motor. For example, the gas canister may be positioned on a top of the motor such that the gas is discharged from the gas canister and directly into the cavity of the propeller. In such an implementation, the gas canister may rotate with a rotation of the motor and the rotation of the propeller.

Figure 4:
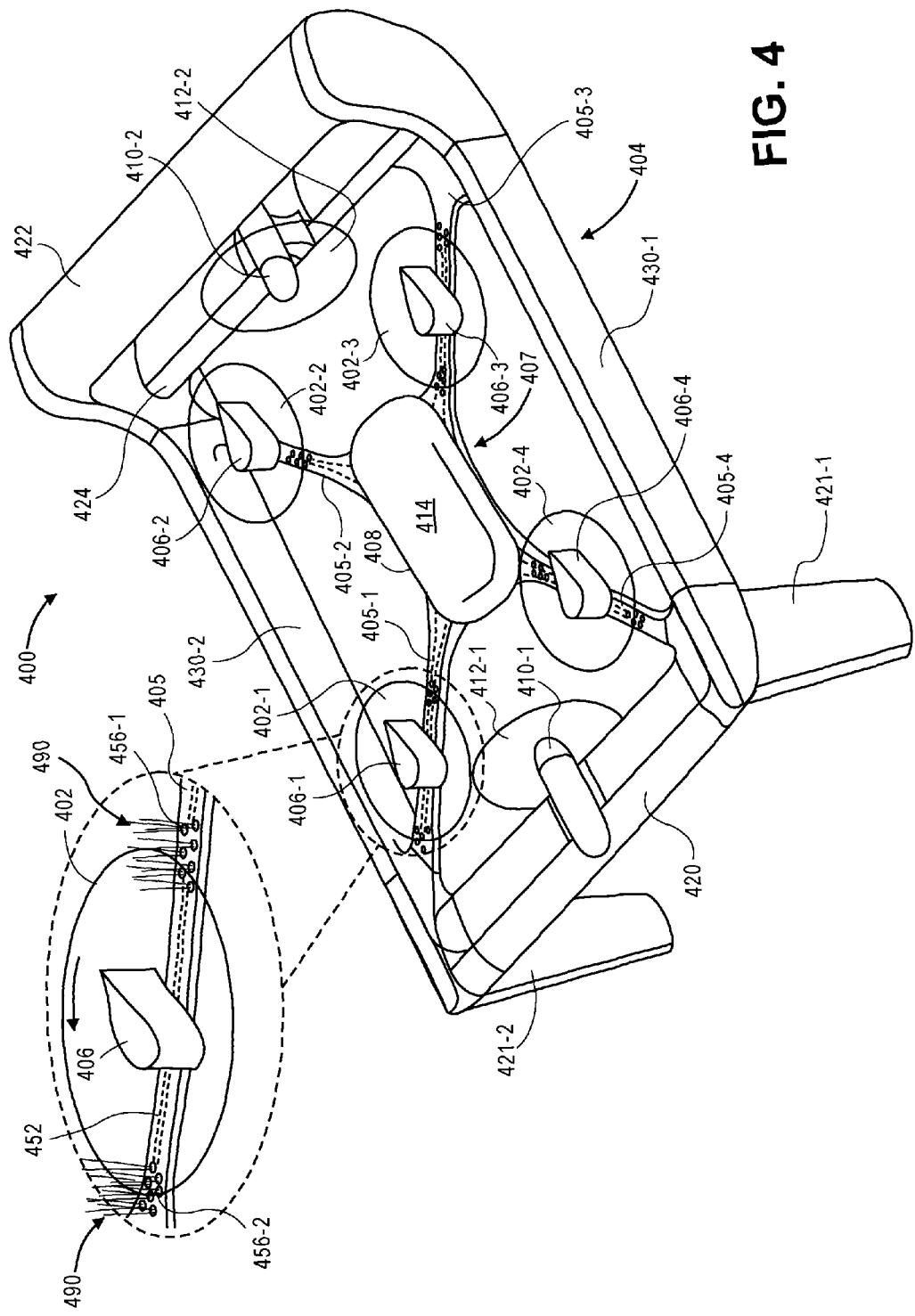
FIG. 4 depicts a view of another aerial vehicle, according to an implementation.

FIG. 4 illustrates a view of another aerial vehicle 400, according to an implementation. As illustrated, the aerial vehicle 400 includes a perimeter frame 404 that includes a front wing 420, a lower rear wing 424, an upper rear wing 422, and two horizontal side rails 430-1, 430-2. The horizontal side rails 430 are coupled to opposing ends of the front wing 420 and opposing ends of the upper rear wing 422 and lower rear wing 424. In some implementations, the coupling may be with a corner junction. In other implementations, the wings and the side rails may be formed of a single mold, or coupled directly together.

The components of the perimeter frame 404, such as the front wing 420, lower rear wing 424, upper rear wing 422, and/or side rails 430-1, 430-2 may be formed of any one or more suitable materials, such as graphite, carbon fiber, aluminum, titanium, etc., or any combination thereof. In the illustrated example, the components of the perimeter frame 404 of the aerial vehicle 400 are each formed of carbon fiber and joined at the corners using corner junctions.

The front wing 420, lower rear wing 424, and upper rear wing 422 are positioned in a tri-wing configuration and each wing provides lift to the aerial vehicle 400 when the aerial vehicle is moving in a direction that includes a horizontal component. For example, the wings may each have an airfoil shape that causes lift due to the airflow passing over the wings during horizontal flight.

In some implementations, to increase the stability and control of the aerial vehicle 400, one or more winglets 421, or stabilizer arms, may also be coupled to and included as part of the perimeter frame 404. In the example illustrated with respect to FIG. 4, there are two front winglets 421-1 and 421-2 mounted to the underneath side of the front left corner junction and the front right corner junction 431-2, respectively. The winglets 421 extend in a downward direction approximately perpendicular to the front wing 420 and side rails 430. Likewise, the two rear corner junctions are also formed and operate as winglets providing additional stability and control to the aerial vehicle 400 when the aerial vehicle 400 is moving in a direction that includes a horizontal component.

Coupled to the interior of the perimeter frame 404 is a central frame 407. The central frame 407 includes a hub 408 and motor arms 405 that extend from the hub 408 and couple to the interior of the perimeter frame 404. In this example, there is a single hub 408 and four motor arms 405-1, 405-2, 405-3, and 405-4. Each of the motor arms 405 extend from approximately a corner of the hub 408 and couple or terminate into a respective interior corner of the perimeter frame. Like the perimeter frame 404, the central frame 407 may be formed of any suitable material, such as graphite, carbon fiber, aluminum, titanium, etc., or any combination thereof. In this example, the central frame 407 is formed of carbon fiber and joined at the corners of the perimeter frame 404 at the corner junctions.

Lifting motors 406 are coupled at approximately a center of each motor arm 405 so that the lifting motor 406 and corresponding lifting propeller 402 are within the substantially rectangular shape of the perimeter frame 404. In one implementation, the lifting motors 406 are mounted to an underneath or bottom side of each motor arm 405 in a downward direction so that the propeller shaft of the lifting motor that mounts to the lifting propeller 402 is facing downward. In other implementations, as illustrated in FIG. 4, the lifting motors 406 may be mounted to a top of the motor arms 405 in an upward direction so that the propeller shaft of the lifting motor that mounts to the lifting propeller 402 is facing upward. In this example, there are four lifting motors 406-1, 406-2, 406-3, 406-4, each mounted to an upper side of a respective motor arm 405-1, 405-2, 405-3, and 405-4.

In some implementations, multiple lifting motors may be coupled to each motor arm 405. For example, while FIG. 4 illustrates a quad-copter configuration with each lifting motor mounted to a top of each motor arm, a similar configuration may be utilized for an octo-copter. For example, in addition to mounting a motor 406 to an upper side of each motor arm 405, another lifting motor may also be mounted to an underneath side of each motor arm 405 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 402 to lift the aerial vehicle 400 and any engaged payload, thereby enabling aerial transport of the payload.

Mounted to each lifting motor 406 is a lifting propeller 402. The lifting propellers 402 may be any form of propeller (e.g., graphite, carbon fiber) and of a size sufficient to lift the aerial vehicle 400 and any payload engaged by the aerial vehicle 400 so that the aerial vehicle 400 can navigate through the air, for example, to deliver a payload to a delivery location. For example, the lifting propellers 402 may each be carbon fiber propellers having a dimension or diameter of twenty-four inches. While the illustration of FIG. 4 shows the lifting propellers 402 all of a same size, in some implementations, one or more of the lifting propellers 402 may be different sizes and/or dimensions. Likewise, while this example includes four lifting propellers 402-1, 402-2, 402-3, 402-4, in other implementations, more or fewer propellers may be utilized as lifting propellers 402. Likewise, in some implementations, the lifting propellers 402 may be positioned at different locations on the aerial vehicle 400. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the aerial vehicle.

In addition to the lifting motors 406 and lifting propellers 402, the aerial vehicle 400 may also include one or more thrusting motors 410 and corresponding thrusting propellers 412. The thrusting motors and thrusting propellers may be the same or different than the lifting motors 406 and lifting propellers 402. For example, in some implementations, the thrusting propellers may be formed of carbon fiber and be approximately eighteen inches long. In other implementations, the thrusting motors may utilize other forms of propulsion to propel the aerial vehicle. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 404 and central frame 407 of the aerial vehicle 400 and utilized to increase the efficiency of flight that includes a horizontal component. For example, when the aerial vehicle 400 is traveling in a direction that includes a horizontal component, the thrusting motors may be engaged to provide a horizontal thrust force via the thrusting propellers to propel the aerial vehicle 400 horizontally. As a result, the speed and power utilized by the lifting motors 406 may be reduced. Alternatively, in selected implementations, the thrusting motors may be oriented at an angle greater or less than ninety degrees with respect to the perimeter frame 404 and the central frame 407 to provide a combination of thrust and lift.

In the example illustrated in FIG. 4, the aerial vehicle 400 includes two thrusting motors 410-1, 410-2 and corresponding thrusting propellers 412-1, 412-2. Specifically, in the illustrated example, there is a front thrusting motor 410-1 coupled to and positioned near an approximate mid-point of the front wing 420. The front thrusting motor 410-1 is oriented such that the corresponding thrusting propeller 412-1 is positioned inside the perimeter frame 404. The second thrusting motor is coupled to and positioned near an approximate mid-point of the lower rear wing 424. The rear thrusting motor 410-2 is oriented such that the corresponding thrusting propeller 412-2 is positioned inside the perimeter frame 404.

While the example illustrated in FIG. 4 illustrates the aerial vehicle with two thrusting motors 410 and corresponding thrusting propellers 412, in other implementations, there may be fewer or additional thrusting motors and corresponding thrusting propellers. For example, in some implementations, the aerial vehicle 400 may only include a single rear thrusting motor 410 and corresponding thrusting propeller 412. In another implementation, there may be two thrusting motors and corresponding thrusting propellers mounted to the lower rear wing 424. In such a configuration, the front thrusting motor 410-1 may be included or omitted from the aerial vehicle 400. Likewise, while the example illustrated in FIG. 4 shows the thrusting motors oriented to position the thrusting propellers inside the perimeter frame 404, in other implementations, one or more of the thrusting motors 410 may be oriented such that the corresponding thrusting propeller 412 is oriented outside of the protective frame 404.

The perimeter frame 404 provides safety for objects foreign to the aerial vehicle 400 by inhibiting access to the lifting propellers 402 from the side of the aerial vehicle 400, provides protection to the aerial vehicle 400, and increases the structural integrity of the aerial vehicle 400. For example, if the aerial vehicle 400 is traveling horizontally and collides with a foreign object (e.g., wall, building), the impact between the aerial vehicle 400 and the foreign object will be with the perimeter frame 404, rather than a propeller. Likewise, because the frame is interconnected with the central frame 407, the forces from the impact are dissipated across both the perimeter frame 404 and the central frame 407.

As illustrated in the expanded view, the motor arms 405 may include one or more openings 456-1, 452-2 from the cavities 452 that run through the motor arms that are configured to allow a gas to pass through the cavity and exit the openings. In this example, rather than, or in addition to discharging gas from cavities positioned on or in the propeller blades, the cavities are positioned in or on the motor arms and the openings of the cavities are positioned so that the discharged gas is directed toward the blade tips of the propeller 402. In the illustrated example, the motor 406 and the propeller 402 are positioned above the motor arm 405 and the openings 456-1, 456-2 are oriented so that the discharged gas 490 is directed upward toward an underneath side of the tip of the propeller blade 402. In other implementations, the openings may extend further along the motor arms 405 so that discharged gas is directed to all and/or other portions of the propeller blade of the propeller 402.

In this example, the openings 456-1, 456-2 are positioned at either end of the motor arm 405 where the tip of the propeller passes over the motor arm 405. When the gas is discharged, the discharge may be controlled so that the gas is only discharged while the propeller blade is passing over the motor arm 405. In other implementations, the motor arm may include a perimeter ring that extends from the motor arm 405 in a circular shape that is approximately the same diameter, or slightly smaller than the diameter of the propeller 402. In such a configuration, the openings may extend around the perimeter ring and the gas may be discharged from one or more openings along the propeller ring that are aligned with the position of the propeller blade as it rotates. In another example, the gas may be discharged from all openings simultaneously. Alternatively, the gas may be discharged prior to the propeller blade passing over the openings and/or the gas may be discharged subsequent to the propeller blade passing over the openings.

If the motor 406 is mounted to the underneath side of the motor arm 405 such that the propeller is beneath the motor arm 405, the openings 456 of the cavity 452 may be positioned on the underneath side of the motor arm and aligned so that the gas is discharged downward toward the propeller blade.

Figure 5:
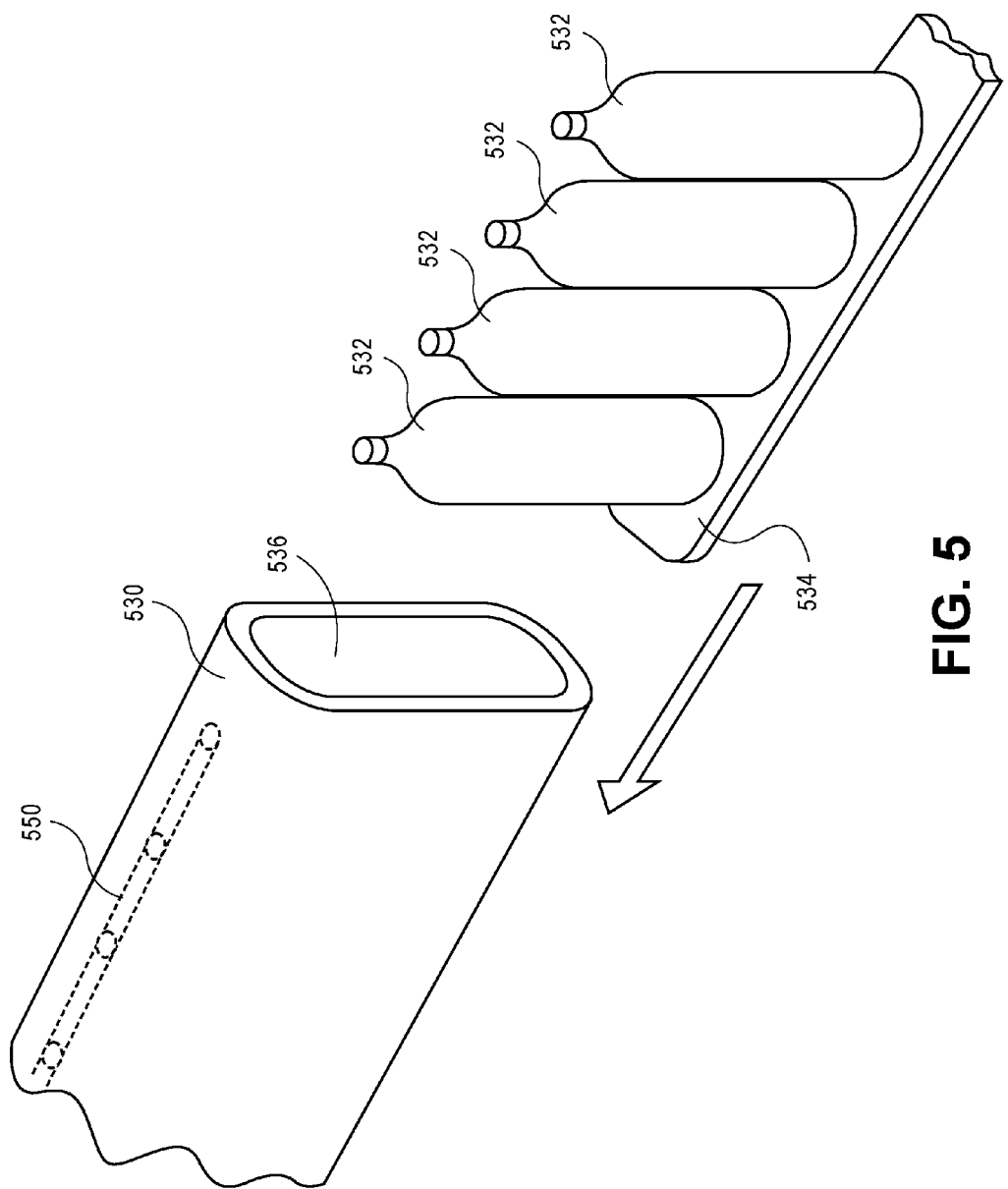
FIG. 5 depicts a view of an arm of an aerial vehicle with gas canisters, according to an implementation.

The perimeter frame 404 also provides a surface upon which one or more components of the aerial vehicle 400 may be mounted. Alternatively, or in addition thereto, one or more components of the aerial vehicle may be mounted or positioned within portions of the perimeter frame 404. For example, as illustrated in FIG. 5, one or more gas canisters may be positioned within one or more of the side rails 430 and cavities may be formed in the frame between the gas canisters and the openings in the motor arm so that gas discharged from the gas canisters will travel to and exit the openings in the motor arms 405.

Other components, such as antennas may be mounted on or in the frame of the aerial vehicle 400. For example, wireless antennas, cameras, time of flight sensors, accelerometers, inclinometers, distance-determining elements, gimbals, Global Positioning System (GPS) receiver/transmitter, altimeters, radars, illumination elements, speakers, and/or any other component of the aerial vehicle 400 or the aerial vehicle control system (discussed below), etc., may be mounted to or in the perimeter frame 404. Likewise, identification or reflective identifiers may be mounted to the perimeter frame 404 to aid in the identification of the aerial vehicle 400.

In some implementations, the perimeter frame 404 may also include a permeable material (e.g., mesh, screen) that extends over the top and/or lower surface of the perimeter frame 404 enclosing the central frame, lifting motors, and/or lifting propellers.

An aerial vehicle control system 414 is also mounted to the central frame 407. In this example, the aerial vehicle control system 414 is mounted to the hub 408 and is enclosed in a protective barrier. The protective barrier may provide the control system 414 weather protection so that the aerial vehicle 400 may operate in rain and/or snow without disrupting the control system 414. In some implementations, the protective barrier may have an aerodynamic shape to reduce drag when the aerial vehicle is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the aerial vehicle 400 includes one or more power modules (not shown). The power modules may be positioned anywhere on the aerial vehicle 400, such as inside the side rails 430-1, 430-2. In other implementations, the power modules may be mounted or positioned at other locations of the aerial vehicle. The power modules for the aerial vehicle may be in the form of battery power, solar power, gas power, super capacitor, fuel cell, alternative power generation source, or a combination thereof. The power module(s) are coupled to and provide power for the aerial vehicle control system 414, the lifting motors 406, the thrusting motors 410, and the payload engagement mechanism (not shown).

In some implementations, one or more of the power modules may be configured such that it can be autonomously removed and/or replaced with another power module while the aerial vehicle is landed or in flight. For example, when the aerial vehicle lands at a location, the aerial vehicle may engage with a charging member at the location that will recharge the power module.

As mentioned above, the aerial vehicle 400 may also include a payload engagement mechanism (not shown). The payload engagement mechanism may be configured to engage and disengage items and/or containers that hold items (payload). In this example, the payload engagement mechanism is positioned beneath and coupled to the hub 408 of the frame 404 of the aerial vehicle 400. The payload engagement mechanism may be of any size sufficient to securely engage and disengage a payload. In other implementations, the payload engagement mechanism may operate as the container in which it contains item(s). The payload engagement mechanism communicates with (via wired or wireless communication) and is controlled by the aerial vehicle control system 414.

FIG. 5 illustrates an example of a side rail 530 of the aerial vehicle illustrated in FIG. 4. In this example, four gas canisters 532 may be installed in the interior 536 of the side rail 530. For example, the gas canisters 532 may be affixed to a gas canister holder 534 that fits within the interior 536 of the side rail 530. In some implementations, the interior 536 may include grooves or ridges that are configured to receive the gas canister holder 534 and/or to provide communication between the gas canisters 532 and a gas discharge controller (discussed below) that controls the discharge of gas from the gas canisters 532. In the example illustrated in FIG. 5, the gas canister holder 534 and corresponding gas canisters 532 fit within the interior 536 of the side rail 530. When positioned in the interior of the side rail, the openings of the gas canisters 532 align with a cavity 550 that is formed in the side rail 530 so that the gas from the canisters can be discharged out of the canisters and through the cavity 550.

In other implementations, the side rail 530 may include an opening on the top, bottom, or side of the side rail 530 that is configured to receive the gas canister holder 534 and gas canisters 532. For example, the side rail 530 may include an opening in the underneath side of the side rail 530 that is approximately the same size and shape as the gas canister holder 534. The gas canisters 532 may be passed through the opening into the interior 536 of the side rail and the gas canister holder 534 may fit into the opening and be secured to the side rail, thereby enclosing the gas canisters into the side rail 530 and securing the openings of the gas canisters 532 into the cavity 550. In such an implementation, the gas canisters 532 may be removed and replaced without having to remove the side rail 530 from the aerial vehicle.

In still another example, the side rail 530 may function as a side rail and a gas canister. Rather than having a separate gas canister holder and gas canisters that may be inserted or removed from the side rail, the gas canisters 532 may be permanently incorporated into the side rail and the side rail(s) may be removed from the aerial vehicle when the gas has been discharged and replaced with another side rail that contains gas. In still another example, the side rail 530 may include an input port through which gas can be filled back into the canisters so that the canisters and/or the side rail 530 can be reused.

Figure 6:
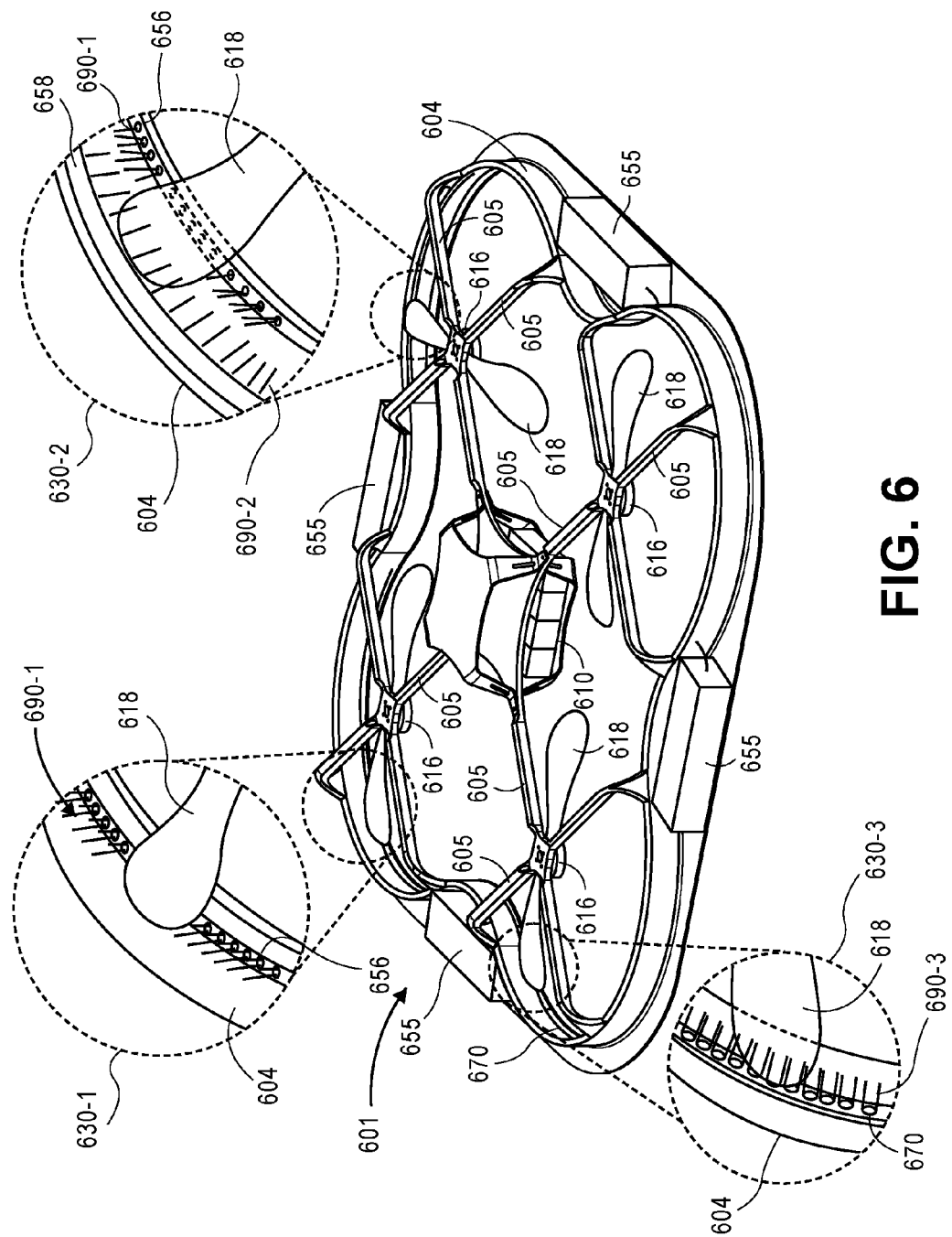
FIG. 6 depicts a view of another aerial vehicle, according to an implementation.

FIG. 6 is a view of another aerial vehicle 601, according to an implementation. In this example, the aerial vehicle 601 includes four propellers 618, each of which is rotated by a motor 616. The aerial vehicle also includes a frame 604, which may be a single unit. The frame 604 may be formed of any type of material, such as carbon fiber, Kevlar, titanium, wood, etc.

Components may be mounted to the frame 604. For example, the motors 616 are mounted to the frame, the aerial vehicle control system 610, which may include the gas discharge controller(s), is mounted to the frame 604, and one or more gas canisters 655 are mounted to the frame 604. The frame is designed to encompass the components of the aerial vehicle 601, including the propellers 618 and provide a protective barrier around the aerial vehicle 601. Other components discussed herein, such as power modules, sensors, etc., may likewise be included on the aerial vehicle 601 illustrated in FIG. 6.

In this example the frame 604 also includes or has attached thereto, a cavity that allows gas to pass from the gas canisters 655 to one or more openings that are proximate the propeller 618 blade tips. For example, the openings may extend around an interior of the frame 604 where the interior of the frame 604 is near the propellers 618. Alternatively, or in addition thereto, the openings may extend along an underneath side of the motor arms 605 and be oriented so that gas exiting the openings is directed toward the propeller 618 that is rotating below the motor arm 605.

In implementations in which the openings extend along the interior of the frame 604 at areas proximate the propeller blades, the openings may be positioned and oriented so that the gas exiting the openings is directed downward toward the upper side of the tips of the propeller blade, upwards toward the underneath side of the tips of the propeller blade, or inward and horizontal with the propeller blades.

For example, referring first to the expanded view 630-1, the openings 656 are aligned along the interior of the frame 604 and positioned beneath the height of the propeller blade such that when the propeller blade is rotating it passes above the openings 656. Likewise, the openings 656 are oriented upward toward the propeller 618 so that the gas 690-1 exiting the openings is directed upward toward an underneath side of the propeller 618. In another example, the openings may be positioned above the height of the propeller blade such that when the propeller blade is rotating it passes below the openings. In such an example, the openings are oriented downward toward the propeller 618 so that the gas 690-1 exiting the openings is directed toward an upper side of the propeller 618.

In another example, as illustrated in the expanded view 630-2, multiple sets of openings 656, 658 may be positioned along the interior of the frame 604 of the aerial vehicle 601 and positioned so that gas exiting the openings is directed toward the propeller 618 as it rotates. For example, the openings 656 are aligned along the interior of the frame 604 and positioned beneath the height of the propeller blade such that when the propeller blade 618 is rotating it passes above the openings 656. Likewise, the openings 656 are oriented upward toward the propeller 618 so that the gas 690-1 exiting the openings is directed upward toward an underneath side of the propeller 618. In addition, the second set of openings 658 are positioned above the height of the propeller blade such that when the propeller blade is rotating it passes below the openings. In such an example, the openings are oriented downward toward the propeller 618 so that the gas 690-1 exiting the openings is directed toward an upper side of the propeller 618. By including two sets of openings, the tip of the propeller blade passes between the two sets of openings and gas can be discharged from both sets of openings simultaneously, from just the upper set of openings, or from just the lower set of openings.

In still another example, referring to expanded view 630-3, the openings 670 may be positioned along the interior of the frame 604 of the aerial vehicle 601 so that they are approximately in-line or at the same height as the propeller 618. In such an example, the openings 670 may be oriented toward the propeller 618 so that gas 690-3 discharged from the opening passes over both the upper side and the lower side of the propeller blade 618.

While the examples discussed with respect to FIG. 6 illustrate positioning of a set of openings above the propeller blade, below the propeller blade, both above and below the propeller blade, or at an approximate same height as the propeller blade, it will be appreciated that any combination of positions may be utilized with the implementations described herein. For example, three sets of openings may be included on the interior of the frame—one set above the propeller, one set below the propeller, and one set at approximately the same height as the propeller. Likewise, the openings may have any variety of orientations. For example, the openings from the set of openings positioned above the propeller blade may be oriented downward toward the propeller blade and at an angle such that the gas exiting the propeller blade is traveling downward and in a direction that is counter to the rotation of the propeller blade. In other implementations, the openings may be oriented differently. In some implementations, the direction or orientation of openings within a set of openings may vary, thereby generating gas flow around the propeller that is turbulent.

In each of the implementations discussed herein, the gas discharge controller may control the discharge of gas by, for example, opening or closing the gas canister to either allow or prohibit gas to pass through the cavity and out the openings of the cavity. In other examples, the gas discharge controller may control the discharge of gas by controlling the openings at the ends of the cavity. For example, the openings at the end of the cavity, such as the openings 656 illustrated in FIG. 6 may be selectively opened or closed by the gas discharge controller to either allow or prohibit the discharge of gas through the opening. For example, rather than allowing gas to exit all of the openings 656 positioned around the interior of the frame 604 of the aerial vehicle, the gas discharge controller may receive propeller position information from the aerial vehicle control system indicating a position of each propeller blade as it rotates. Based on the position information, the gas discharge controller may open and close the openings of the cavity so that gas is only discharged from openings that are proximate the propeller blade tip. In such an example, the openings are opened and closed as the propeller rotates so that gas is discharged toward the propeller blade as it rotates.

Figure 7:
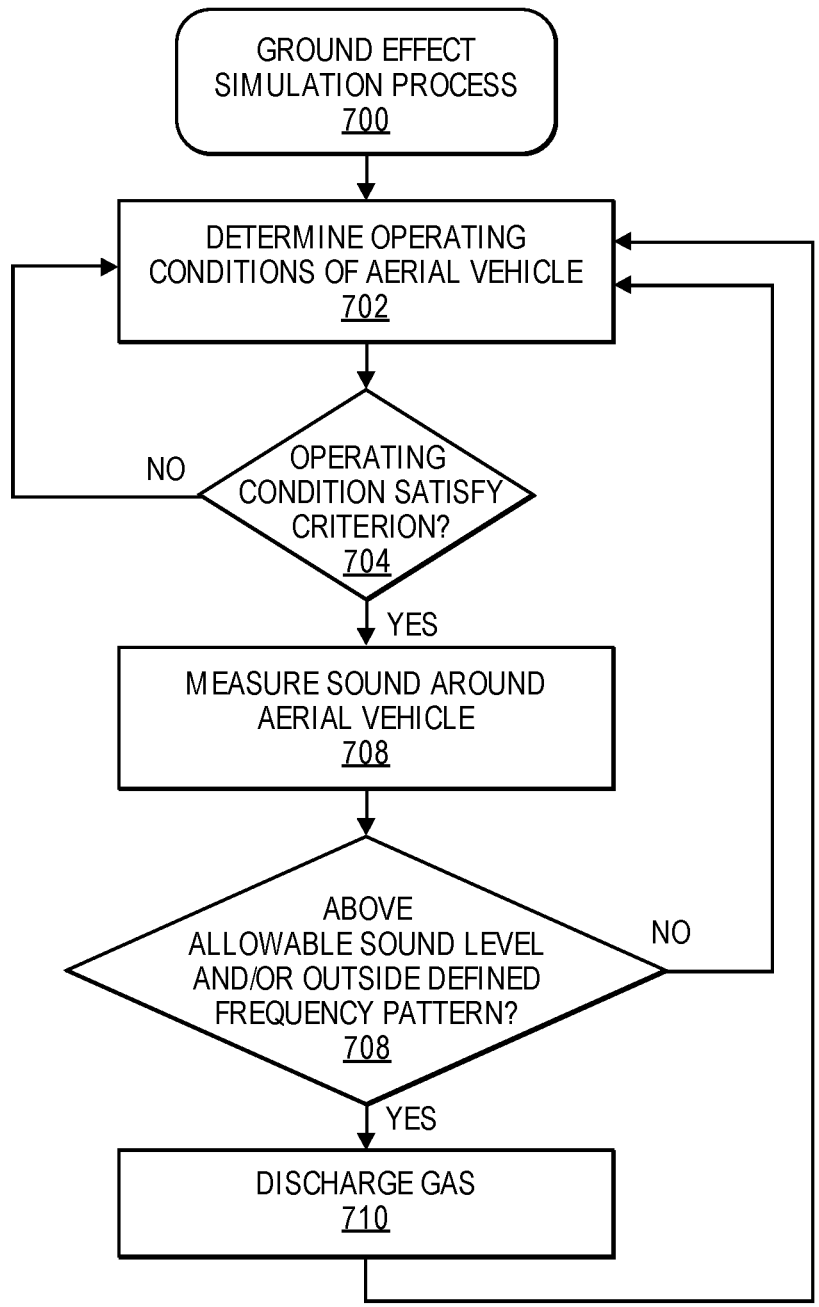
FIG. 7 is a flow diagram illustrating an example ground effect simulation process, according to an implementation.

FIG. 7 is a flow diagram illustrating an example ground effect simulation process 700, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 700 begins by determining one or more operating conditions of the aerial vehicle, as in 702. The operating conditions may be any measurable aspect of the aerial vehicle and/or the environment around the aerial vehicle. For example, operating conditions may include, but are not limited to, an altitude of the aerial vehicle, a sound level around the aerial vehicle, a frequency spectrum of sound around the aerial vehicle, a position of the aerial vehicle, a distance between the aerial vehicle and an object (e.g., human, building), etc.

A determination is then made as to whether the operating condition(s) satisfies one or more criteria, as in 704. The criterion may be any defined criterion corresponding to an operating condition. For example, a criterion may be a defined altitude and the criterion satisfied when the aerial vehicle is flying below the defined altitude. In some implementations, the example process 700 may determine whether multiple criteria are satisfied, such as the aerial vehicle being below a defined altitude during a particular time of day or within a particular area, before the example process proceeds to block 708.

The criterion may vary for different aerial vehicles, different locations, different times of day, different days of the week, etc. For example, the defined altitude may be different for rural areas than urban areas. As another example, the defined altitude may be lower in suburban areas during weekday work hours (e.g., 09:00-17:00) than during non-work hours.

If it is determined that one or more of the operating conditions satisfy one or more criteria, the sound around the aerial vehicle is measured, as in 708. Based on the measured sound, a determination is made as to whether the sound is above an allowable sound level and/or outside a defined frequency spectrum, as in 708. The allowable sound level may be any defined sound level and may vary for different aerial vehicles, different locations, different times of day, etc. Likewise, the defined frequency spectrum may be any defined frequency spectrum and may also vary.

If it is determined that the sound around the aerial vehicle is not above the allowable sound level and not outside the defined frequency spectrum, the example process 700 returns to block 702 and continues. However, if it is determined that the sound around the aerial vehicle is above the allowable sound level and/or outside the defined frequency spectrum, gas is discharged from one or more openings on the aerial vehicle that are proximate to one or more propeller blades of the aerial vehicle, as in 710. As discussed above, the gas is discharged with a velocity sufficient to disrupt the airflow around the propeller blade. For example, the velocity of the discharged gas may disrupt the formation of vortices at the blade tip and/or to displace formed vortices out of the path of a following propeller to reduce BVI. By disrupting the airflow around the propeller blade, the sound generated by the rotation of the propeller is reduced and/or otherwise altered. For example, the relative and/or absolute amplitudes of various frequency components of the sound may be altered. In some implementations, the gas may be discharged from openings positioned on or proximate to each of the propeller blades of the aerial vehicle. In other implementations, the gas may only be discharged from or proximate to one or more propeller blades of the aerial vehicle.

As the gas is discharged, the example process returns to block 702. When gas discharge is initiated, the discharge may continue until the operating conditions no longer satisfy the criterion. Likewise, the velocity of the discharged gas may continue to be increased until the measured sound around the aerial vehicle is below the allowable sound level and/or within the defined frequency spectrum. When the sound is below the allowable sound level and/or within defined frequency spectrum, the gas may continue to be discharged at an approximately continuous velocity until the criteria are no longer satisfied.

The example process may be performed any time the aerial vehicle is operational. For example, if an aerial vehicle is aerially navigating to a delivery destination where it will deliver a package that contains a customer ordered item, the example process 700 may be performed. As the aerial vehicle approaches the delivery destination, the altitude (an operating condition) may be monitored. When the aerial vehicle descends to an altitude that is below a defined altitude (e.g., 25 feet), the example process may cause the sound around the aerial vehicle to be monitored and determine if the measured sound is above an allowable sound level and/or outside a defined frequency range. If it is determined that the measured sound is above an allowable sound level and/or outside a defined frequency range, gas may be discharged toward one or more propeller blades of the aerial vehicle to reduce or otherwise alter the sound generated by the rotation of the propeller blades. Reducing or otherwise altering the sound generated by the rotating propeller blades, reduces or otherwise alters the total sound around the aerial vehicle, thereby making delivery of the item by the aerial vehicle quieter.

Figure 8:
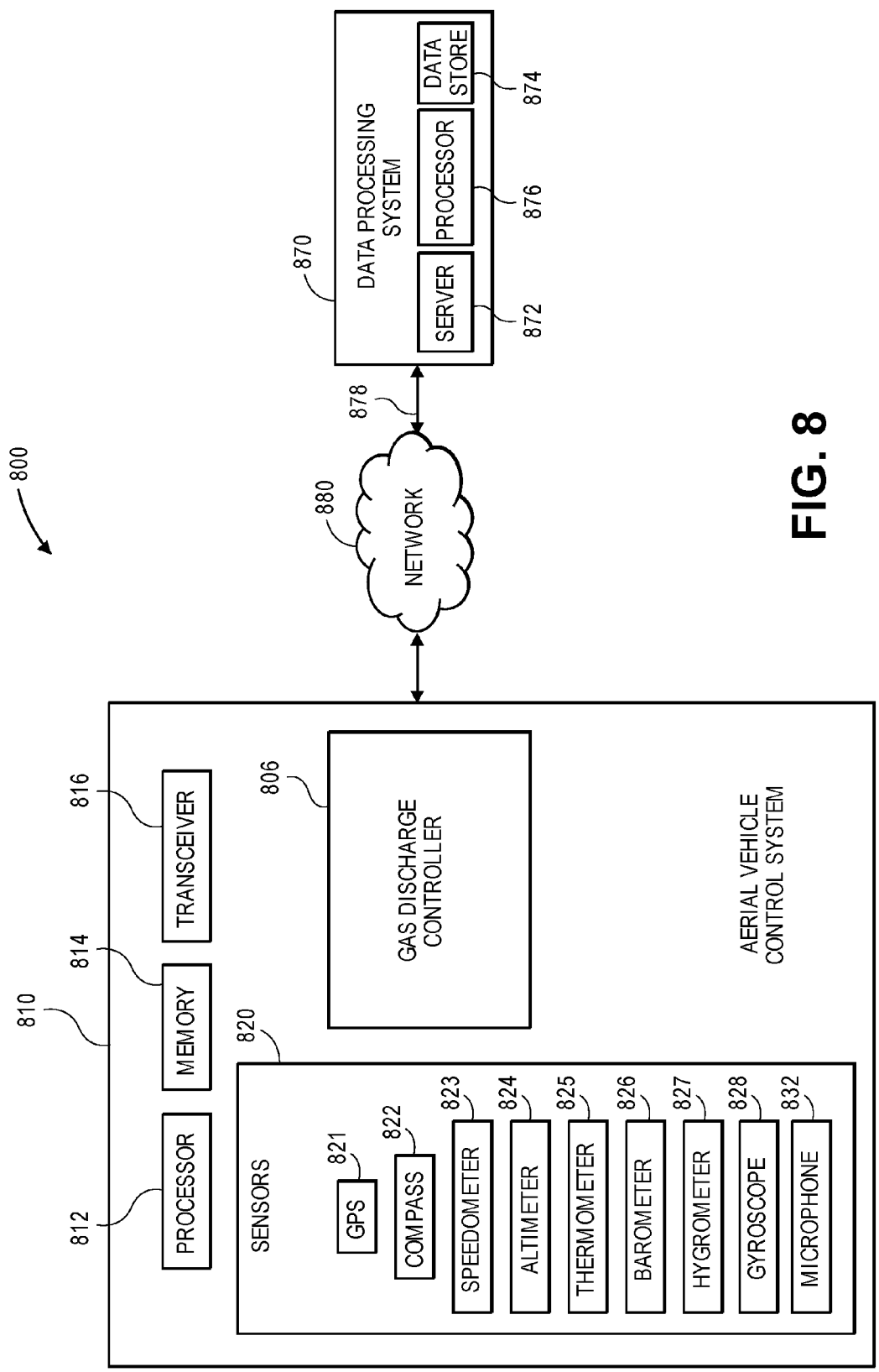
FIG. 8 is a block diagram illustrating various components of an unmanned aerial vehicle control system, according to an implementation.

FIG. 8 illustrates a block diagram of components of one systems 800 for controlling sound generated by an aerial vehicle, in accordance with an implementation. The system 800 of FIG. 8 includes an aerial vehicle control system 810 of an aerial vehicle, such as those discussed above, and may also include a data processing system 870 connected via a network 880. The aerial vehicle control system 810 includes a processor 812, a memory 814 and a transceiver 816, as well as a plurality of sensors 820, and a gas discharge controller 806. In some implementations, the aerial vehicle control system may include multiple gas discharge controllers, each one controlling discharge of gas proximate a respective propeller. In other implementations, a single gas discharge controller may control discharge of gas from all openings on the aerial vehicle.

The processor 812 may be configured to perform any type or form of computing function, including but not limited to the execution of the example process 700 and/or the other implementations and methods discussed herein. For example, the processor 812 may control any aspects of the operation of the aerial vehicle control system 810 and the one or more computer-based components thereon, including but not limited to the transceiver 816, the sensors 820, and/or the gas discharge controller 806. The aerial vehicle control system 810 may likewise generate instructions for conducting various operations, e.g., for operating one or more rotors, motors, rudders, ailerons, flaps or other components provided on the aerial vehicle. The aerial vehicle control system 810 further includes one or more memory or storage components 814 for storing any type of information or data, e.g., instructions for operating the aerial vehicle, propeller position information, criterion, or information or data captured by one or more of the sensors 820 (e.g., operating conditions).

The transceiver 816 may be configured to enable the aerial vehicle control system 810 to communicate through one or more wired or wireless means, e.g., wired technologies such as Universal Serial Bus (or "USB") or fiber optic cable, or standard wireless protocols, such as Bluetooth® or any Wireless Fidelity (or "Wi-Fi") protocol, such as over the network 880 or directly.

The sensors 820 may include any components or features for determining one or more operating conditions relating to the aerial vehicle, including extrinsic information or data or intrinsic information or data. As is shown in FIG. 8, the sensors 820 may include, but are not limited to, a Global Positioning System ("GPS") receiver or sensor 821, a compass 822, a speedometer 823, an altimeter 824, a thermometer 825, a barometer 826, a hygrometer 827, a gyroscope 828, and/or a microphone 832. The GPS sensor 821 may be any device, component, system or instrument adapted to receive signals (e.g., trilateration data or information) relating to a position of the aerial vehicle from one or more GPS satellites of a GPS network (not shown). The compass 822 may be any device, component, system, or instrument adapted to determine one or more directions with respect to a frame of reference that is fixed with respect to the surface of the Earth (e.g., a pole thereof). The speedometer 823 may be any device, component, system, or instrument for determining a speed or velocity of the aerial vehicle, and may include related components (not shown) such as pitot tubes, accelerometers, or other features for determining speeds, velocities, or accelerations.

The altimeter 824 may be any device, component, system, or instrument for determining an altitude of the aerial vehicle, and may include any number of barometers, transmitters, receivers, range finders (e.g., laser or radar) or other features for determining heights. The thermometer 825, the barometer 826 and the hygrometer 827 may be any devices, components, systems, or instruments for determining local air temperatures, atmospheric pressures, or humidities within a vicinity of the aerial vehicle. The gyroscope 828 may be any mechanical or electrical device, component, system, or instrument for determining an orientation, e.g., the orientation of the aerial vehicle. For example, the gyroscope 828 may be a traditional mechanical gyroscope having at least a pair of gimbals and a flywheel or rotor. Alternatively, the gyroscope 828 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle. The microphone 832 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 832 may also be provided as a discrete component, or in combination with one or more other components, e.g., an imaging device, such as a digital camera. Furthermore, the microphone 832 may be configured to detect and record acoustic energy from any and all directions.

Those of ordinary skill in the pertinent arts will recognize that the sensors 820 may include any type or form of device or component for determining a condition within a vicinity of the aerial vehicle in accordance with the present disclosure. For example, the sensors 820 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, as well as one or more imaging devices (e.g., digital cameras), and are not limited to the sensors 821, 822, 823, 824, 825, 826, 827, 828, 832 shown in FIG. 8.

The data processing system 870 includes one or more physical computer servers 872 having a plurality of data stores 874 associated therewith, as well as one or more computer processors 876 provided for any specific or general purpose. For example, the data processing system 870 of FIG. 8 may be independently provided for the exclusive purpose of receiving, analyzing or storing sounds, gas discharge locations/altitudes, resulting sound measurements, and/or other information or data received from the aerial vehicle control system 810. The servers 872 may be connected to or otherwise communicate with the data stores 874 and the processors 876. The data stores 874 may store any type of information or data, including but not limited to sound information or data, and/or information or data regarding operating conditions, etc. The servers 872 and/or the computer processors 876 may also connect to or otherwise communicate with the network 880, as indicated by line 878, through the sending and receiving of digital data. For example, the data processing system 870 may include any facilities, stations or locations having the ability or capacity to receive and store information or data, such as media files, in one or more data stores, e.g., media files received from the aerial vehicle control system 810, or from one another, or from one or more other external computer systems (not shown) via the network 880. In some implementations, the data processing system 870 may be provided in a physical location. In other such implementations, the data processing system 870 may be provided in one or more alternate or virtual locations, e.g., in a "cloud"-based environment. In still other implementations, the data processing system 870 may be provided onboard one or more aerial vehicles, including but not limited to the aerial vehicle that contains the aerial vehicle control system 810.

The network 880 may be any wired network, wireless network, or combination thereof, and may comprise the Internet in whole or in part. In addition, the network 880 may be a personal area network, local area network, wide area network, cable network, satellite network, cellular telephone network, or combination thereof. The network 880 may also be a publicly accessible network of linked networks, possibly operated by various distinct parties, such as the Internet. In some implementations, the network 880 may be a private or semi-private network, such as a corporate or university intranet. The network 880 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle control system 810 or the data processing system 870 may use any web-enabled or Internet applications or features, or any other client-server applications or features including E-mail or other messaging techniques, to connect to the network 880, or to communicate with one another, such as through short or multimedia messaging service (SMS or MMS) text messages. For example, the aerial vehicle control system 810 may be adapted to transmit information or data in the form of synchronous or asynchronous messages to the data processing system 870 or to any other computer device in real time or in near-real time, or in one or more offline processes, via the network 880. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 812 or the processor 876, or any other computers or control systems utilized by the aerial vehicle control system 810 or the data processing system 870, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or include signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations disclosed herein reference the use of unmanned aerial vehicles to deliver payloads to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language, such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the disclosure has been described and illustrated with respect to illustrative implementations thereof, the foregoing and various other additions and omissions may be made therein and thereto without departing from the spirit and scope of the present disclosure.

What is claimed is:
1. An aerial vehicle comprising:
a motor configured to rotate a propeller such that the propeller generates a lifting force;
the propeller including:
  a hub that is coupled to the motor so that the motor can rotate the propeller;
  a propeller blade extending from the hub, the propeller blade including:
    a tip;
    a cavity extending from the hub to the tip and including an opening at the tip of the propeller blade, wherein the cavity is configured to allow a gas to pass through the cavity and exit the opening proximate the tip of the propeller blade;
a gas canister that contains the gas; and
a gas discharge controller configured to control a discharge of the gas canister, wherein when the gas canister is discharged when gas contained in the gas canister exits the gas canister, passes through the cavity of the propeller blade, and exits the opening at the tip of the propeller blade.

2. The aerial vehicle of claim 1, wherein the gas is at least one of air, hydrogen, helium, nitrogen, oxygen, argon, krypton, or xenon.

3. The aerial vehicle of claim 1, further comprising:
a navigation component configured to determine an altitude of the aerial vehicle; and
wherein the gas discharge controller causes the gas to be discharged from the gas canister when the aerial vehicle is below a defined altitude.

4. The aerial vehicle of claim 1, wherein the gas exiting the opening at the tip of the propeller blade disrupts a flow of air around the tip of the propeller blade.

5. The aerial vehicle of claim 4, wherein the disruption of the flow of air around the tip of the propeller blade reduces a sound generated by a rotation of the propeller blade.

6. An aerial vehicle, comprising:
a frame;
a motor configured to rotate a propeller;
the propeller coupled to the motor;
a gas canister affixed to the frame of the aerial vehicle, the gas canister containing a gas prior to the gas being discharged;
a cavity that extends from the gas canister to a position proximate a tip of the propeller; and
a gas discharge controller configured to control a discharge of the gas from the gas canister such that the gas is discharged out of an opening in the cavity and around at least a portion of the propeller while the propeller is rotated by the motor.

7. The aerial vehicle of claim 6, further comprising:
a second motor configured to rotate a second propeller;
the second propeller coupled to and rotated by the second motor; and
wherein the gas discharge controller is configured to control the discharge of gas:
around at least a portion of the propeller while the propeller is rotated by the motor; or
around at least a portion of the second propeller while the second propeller is rotated by the second motor.

8. The aerial vehicle of claim 6, wherein the cavity includes a plurality of openings.

9. The aerial vehicle of claim 6, further comprising:
a scoop configured to collect air from around the aerial vehicle; and
a pump configured to pump the collected air through a cavity such that the collected air is discharged around at least the portion of the propeller, wherein the gas includes the collected air.

10. An aerial vehicle comprising:
a motor configured to rotate a propeller such that the propeller generates a lifting force;
the propeller including a surface area having an opening along the surface area; and
a gas discharge controller configured to control a discharge of the gas from the opening.

11. The aerial vehicle of claim 10, wherein the gas is at least one of air, hydrogen, helium, nitrogen, oxygen, argon, krypton, or xenon.

12. The aerial vehicle of claim 10, further comprising:
a navigation component configured to determine an altitude of the aerial vehicle; and
wherein the gas discharge controller causes the gas to be discharged from the opening when the aerial vehicle is below a defined altitude.

13. The aerial vehicle of claim 10, further comprising:
a gas canister that contains the gas prior to the gas being discharged.

14. The aerial vehicle of claim 10, further comprising:
a sensor configured to monitor an operating condition of the aerial vehicle; and
wherein the gas discharge controller discharges the gas when the operating condition satisfies a criterion.

15. The aerial vehicle of claim 10, further comprising:
a scoop configured to collect air from around the aerial vehicle; and
a pump configured to pump the collected air through a cavity such that the collected air is discharged through the opening.

16. The aerial vehicle of claim 10, wherein the propeller includes a plurality of openings.

17. The aerial vehicle of claim 16, wherein the gas discharge controller is configured to selectively discharge the gas through one or more of the plurality of openings.

* * * * *